United States Patent
Kakuno

[11] Patent Number: 6,075,675
[45] Date of Patent: Jun. 13, 2000

[54] MAGNETIC HEAD AND MAGNETIC HEAD SUPPORT STRUCTURE

[75] Inventor: Tsuyoshi Kakuno, Fukushima-ken, Japan

[73] Assignee: Alps Electric Co., Ltd., Tokyo, Japan

[21] Appl. No.: 08/982,229

[22] Filed: Dec. 17, 1997

[30] Foreign Application Priority Data

Dec. 25, 1996 [JP] Japan .................................. 8-346229
Dec. 26, 1996 [JP] Japan .................................. 8-349080

[51] Int. Cl.⁷ ...................................................... G11B 5/48
[52] U.S. Cl. ............................................................ 360/104
[58] Field of Search ................................ 360/104, 106, 360/103

[56] References Cited

U.S. PATENT DOCUMENTS 5,001,583  3/1991  Matsuzaki ................................ 360/104
5,091,810  2/1992  Kakizaki et al. ......................... 360/103

FOREIGN PATENT DOCUMENTS 63-49883  12/1988  Japan .

*Primary Examiner*—George J. Letscher
*Attorney, Agent, or Firm*—Brinks Hofer Gilson & Lione

[57] ABSTRACT

Disclosed are a magnetic head and a magnetic head support structure in which the slider is reliably held on the magnetic disc even when the magnetic disc is rotated at high speed, whereby a satisfactory read/write characteristic is obtained.

For this purpose, the magnetic head of the present invention, the relationship between the size of the slider and the position of the magnetic gap provided in the slider is numerically specified.

In the magnetic head support structure of the present invention, both the magnetic gap provided in the slider and the pivot supporting this slider are arranged on the downstream side with respect to the rotating direction of the magnetic disc.

6 Claims, 6 Drawing Sheets

FIG. 3

| NO | LENGTH OF ENTIRE SLIDER (L) | DISTANCE BETWEEN SLIDER UPSTREAM END AND MAGNETIC GAP (A) | SLIDER THICKNESS (H) | (A/L) × (1/H) |
|---|---|---|---|---|
| 1 | 3.048 | 2.845 | 0.635 | 1.463 |
| 2 | 3.022 | 1.620 | 0.633 | 0.847 |
| 3 | 3.022 | 1.620 | 0.512 | 1.047 |
| 4 | 3.497 | 2.997 | 1.270 | 0.675 |
| 5 | 3.497 | 2.997 | 0.630 | 1.360 |
| 6 | 3.488 | 2.630 | 2.309 | 0.327 |
| 7 | 2.997 | 2.845 | 0.864 | 1.099 |
| 8 | 2.997 | 2.845 | 0.630 | 1.507 |
| 9 | 3.001 | 2.632 | 1.302 | 0.674 |
| 10 | 4.320 | 2.632 | 1.470 | 0.414 |
| 11 | 4.297 | 3.020 | 0.852 | 0.825 |
| 12 | 4.311 | 2.854 | 1.304 | 0.508 |
| 13 | 3.500 | 1.650 | 2.300 | 0.205 |
| 14 | 3.500 | 1.650 | 0.502 | 0.939 |
| 15 | 3.515 | 2.851 | 0.635 | 1.277 |
| 16 | 3.857 | 2.999 | 0.633 | 1.228 |
| 17 | 3.857 | 2.999 | 1.402 | 0.555 |
| 18 | 3.850 | 2.641 | 0.960 | 0.715 | ial
MAGNETIC HEAD AND MAGNETIC HEAD SUPPORT STRUCTURE

BACKGROUND OF THE INVENTION

1. Field of the Invention

The present invention relates to a magnetic head that is held in slide contact with, for example, a magnetic recording medium, to record or reproduce information, and to a support structure suitably applicable to a magnetic head.

2. Description of the Related Art

Generally speaking, a magnetic recording/reproducing apparatus is used for the recording/reproduction of information of a computer or the like. In a magnetic recording/reproducing apparatus, information is recorded/reproduced on/from a magnetic recording medium by means of a magnetic head.

FIG. 10 shows an example of a conventional magnetic head.

In the drawing, numeral 1 indicates a magnetic head, and numeral 2 indicates a magnetic disc (magnetic recording medium).

The magnetic head 1 is held in slide contact with the magnetic disc 2 rotating in the direction indicated by an arrow B, and performs the recording/reproducing of information. The magnetic head 1 is generally composed of a slider 3 (the main body of the magnetic head) and a gimbal spring 4 joined to the slider 3. The magnetic head 1 is supported such that it receives a slight biasing force toward the magnetic disc 2 at a support point 5a of a pivot 5 (support member).

A magnetic gap 6 is formed on the upstream side J with respect to the rotation (running) of the slide contact surface of the slider 3, which records/reproduces information on/from the magnetic disc 2 by using this magnetic gap 6.

Further, the slider 3 is swingable around the portion where the center C with respect to the direction of the arrow B crosses the gimbal spring 4.

The operation of the magnetic head 1, constructed as described above, will now be described.

The gimbal spring 4 is supported while being biased toward the magnetic disc 2 by the pivot 5.

The gimbal spring 4 is joined to the slider 3, so that the slider 3 is also biased toward the magnetic disc 2 by the biasing force of the pivot 5.

Due to this arrangement, the slider 3 is held in slide contact with the magnetic disc 2, and the recording and reproduction of information is made possible by using the magnetic gap 6.

The magnetic disc 2 rotates (runs) in the direction of the arrow B, so that, on the surface where the slider 3 is in contact with the magnetic disc 2, the contact resistance on the upstream side J with respect to the rotating (running) direction is liable to be rather large.

Further, the slider 3 is swingable around the portion where the center C with respect to the direction of the arrow B thereof crosses the gimbal spring 4.

As a result, the slider 3, whose contact resistance on the upstream side J has increased, is pitched forward, and the portion of the slider 3 on the upstream side J is brought close to the magnetic disc 2 while the portion of the slider 3 on the downstream side K is inclined so as to be raised from the magnetic disc 2.

In this condition, for the slider 3 to maintain the holding state with respect to the magnetic disc 2, the magnetic gap 6 and the support point 5a of the pivot 5 are positioned in the vicinity of the center C of the slider 3 or somewhat nearer to the upstream side J.

The above-described conventional magnetic head has the following problem:

To meet the demand for an increase in information recording/reproducing speed, it is necessary to increase the rotating speed of the magnetic disc 2.

As a result of an increase in the rotating speed of the magnetic disc 2, an airflow is generated. The airflow enters the gap between the slider 3 and the magnetic disc 2, with the result that the upstream side J is raised, and the downstream side K is brought close to the magnetic disc 2 to thereby cancel their holding state. As a result, a satisfactory read/write characteristic cannot be obtained.

This problem might be overcome by enhancing the biasing force provided by the pivot 5. However, that would lead to an excessively high contact pressure, thereby damaging the magnetic disc 2 and applying an excessive load to the motor for rotating the magnetic disc 2.

SUMMARY OF THE INVENTION

The present invention has been made with a view toward solving the above problem in the prior art. It is an object of the present invention to provide a magnetic head and a magnetic head supporting structure in which the slider can be reliably maintained in the holding state with respect to the magnetic disc even when the magnetic disc is rotated at high speed and in which a satisfactory read/write characteristic can be obtained.

To achieve the above object, there is provided, in accordance with the present invention, a magnetic head which records and reproduces information while being held in slide contact with a recording medium running in a direction and which is equipped with a magnetic head main body having a magnetic gap formed on the surface held in slide contact, wherein the magnetic head is situated on the downstream side of the center of the magnetic head main body with respect to the above-mentioned direction, and wherein the relationship holds true: $(A/L) \times (1/H) \geq 1.0$, where L is the length in the above-mentioned direction of the magnetic head main body, A is the distance between the upstream end in the above-mentioned direction of the magnetic head main body and the magnetic gap, and H is the thickness of the magnetic head main body.

Thus, in the magnetic head of the present invention, the distance between the center of gravity of the magnetic head main body and the slide contact surface is short, so that the attitude of the magnetic head main body varies little even when air flows in.

Further, since the magnetic gap is at a downstream position spaced apart from the center of the magnetic head main body, the holding state of the magnetic head with respect to the magnetic recording medium is maintained even when the upstream side of the magnetic head main body is raised.

Further, the magnetic head of the present invention is characterized in that the value of the above $(A/L) \times (1/H)$ is not less than 1.2.

Thus, in the magnetic head of the present invention, the holding state of the magnetic head with respect to the magnetic recording medium can be maintained in a more satisfactory manner.

In accordance with the present invention, there is further provided a magnetic head support structure comprising: a magnetic head main body held in slide contact with a magnetic recording medium running in a direction to record/reproduce information; a gimbal spring joined to the magnetic head main body and swingably supporting the magnetic head main body; and a support member for supporting the gimbal spring at a support point toward the magnetic recording medium, wherein a magnetic gap is formed in the slide contact surface of the magnetic head main body at a position on the downstream side of the center of the magnetic head main body with respect to the above-mentioned direction, and wherein the support point is arranged at a position which is on the downstream side of the above-mentioned center and which is spaced apart from the center.

Thus, in the magnetic head support structure of the present invention, the magnetic gap is positioned on the downstream side of the magnetic head main body even when the upstream side of the magnetic main body is raised, and the support point of the support member is arranged at a position spaced apart from the above-mentioned center to support the gimbal spring to which the magnetic head is joined toward the magnetic recording medium, whereby the magnetic head main body is maintained in the holding state with respect to the magnetic recording medium.

Further, in the above-described magnetic head support structure described above, the support point of the support member is positioned on the upstream side of the magnetic gap, and, assuming that the distance between the center of the magnetic head main body and the position of the support point is a first distance, and that the distance between the center of the magnetic head main body and the magnetic gap is a second distance, the ratio of the first distance to the second distance is 0.22 or more.

Thus, in the magnetic head support structure of the present invention, the magnetic head main body is maintained in a holding state with respect to the magnetic recording medium in a satisfactory manner, whereby a satisfactory read/write characteristic can be obtained.

Further, in the magnetic head support structure of the present invention, the center of the magnetic head main body is matched with a swinging axis formed by the gimbal spring support portion.

Thus, in the magnetic head support structure of the present invention, the center of the magnetic head main body is swingable around the swinging axis formed by the gimbal spring support portion.

On the other hand, in the magnetic head support structure of the present invention, the gimbal spring support portion is formed on the downstream side at a position spaced apart from the center of the magnetic head main body and on the upstream side of the support point of the support member.

Thus, in the magnetic head support structure of the present invention, the area of the magnetic head main body is larger on the upstream side of the support portion, so that the upstream side is raised accordingly.

That is, the slide contact of the magnetic head with the magnetic recording medium is enhanced on the downstream side.

Further, in the above-described magnetic head support structure of the present invention, the distance between the swinging axis and the center of the magnetic head main body is 0.5 mm or less.

Thus, in the magnetic head support structure of the present invention, the holding state of the magnetic head main body with respect to the recording medium is maintained in a satisfactory manner, whereby a satisfactory read/write characteristic can be obtained.

BRIEF DESCRIPTION OF THE DRAWINGS

FIG. 3 is table showing various dimension values of a magnetic head according to an embodiment of the present invention;

DETAILED DESCRIPTION OF THE PREFERRED EMBODIMENT

First, a magnetic head according to an embodiment of the present invention will be described with reference to FIGS. 1 through 4.

Figure 10:
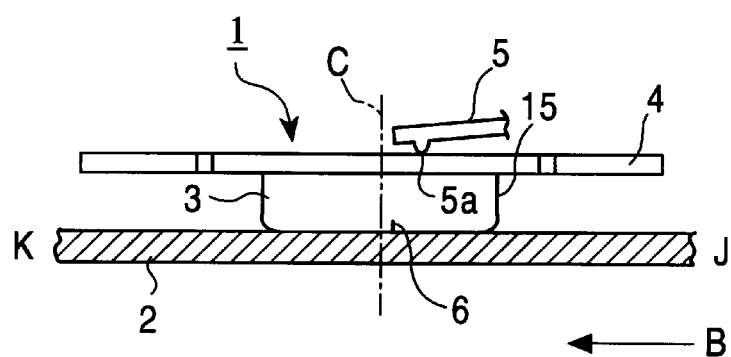
FIG. 10 is a front view of a conventional magnetic head.

In the drawings, the components which are the same as those of the conventional example shown in FIG. 10 are indicated by the same reference numerals, and a description of such components will be omitted.

Figure 1:
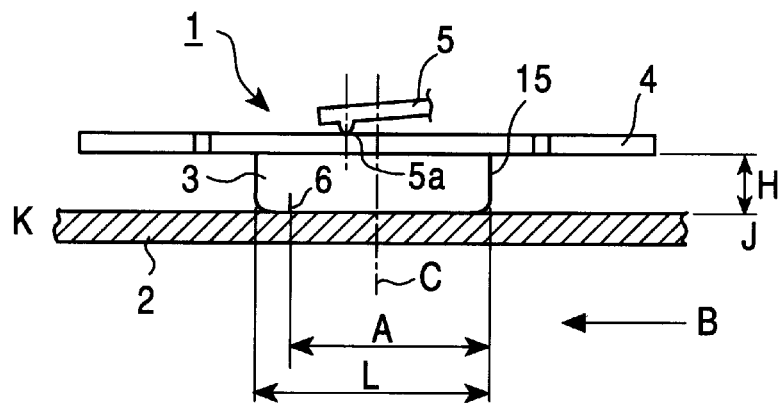
FIG. 1 is a front view showing a magnetic head in accordance with an embodiment of the present invention which is in slide contact with a magnetic recording medium.

In FIG. 1, numeral 1 indicates a magnetic head, and numeral 2 indicates a magnetic disc.

The magnetic head 1 is in slide contact with the magnetic disc 2 rotating (running) in the direction of an arrow B to record/reproduce information, and is substantially composed of a slider 3 and a gimbal spring 4 joined to the slider 3.

The thickness of the slider 3 as measured in the direction of the magnetic disc 2 is indicated by symbol H, and the length of the slider 3 as measured in the direction of the arrow B is indicated by symbol L. On the downstream side K of the contact surface of the slider 3, there is formed a magnetic gap 6 at a position spaced apart from the end portion 15 on the upstream side thereof with respect to the direction of the arrow B by a distance A.

The surface of the slider 3 which is opposite to the slide contact surface is joined to the gimbal spring 4.

Figure 2:
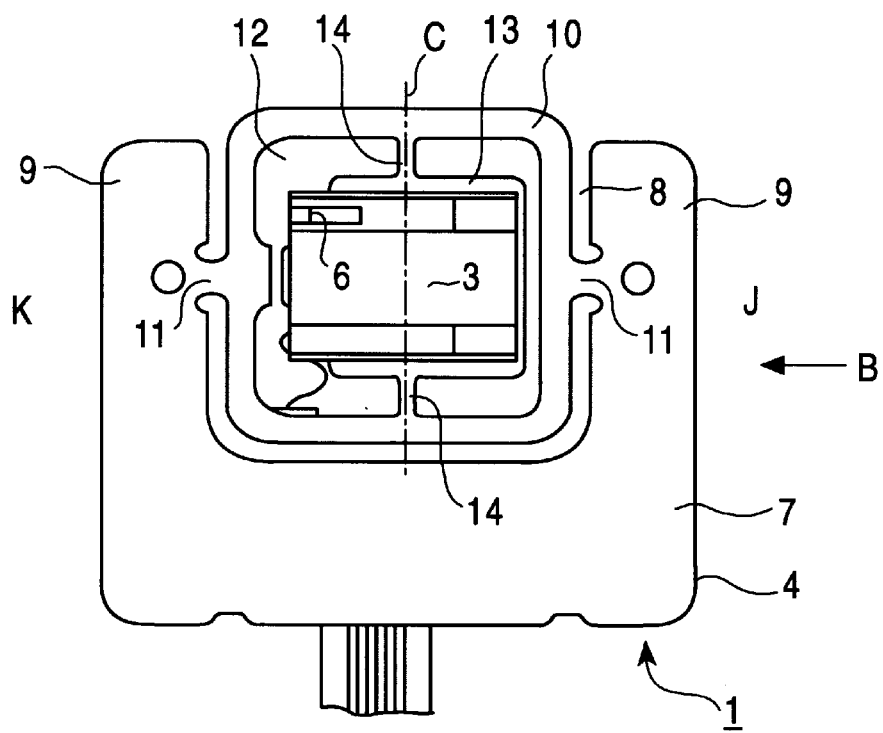
FIG. 2 is a plan view showing a magnetic head in accordance with an embodiment of the present invention in a state in which the magnetic head main body is joined to a gimbal spring.

As shown in FIG. 2, the gimbal spring 4 is formed by an elastic material which is substantially rectangular in plan view.

The main body 7 of the gimbal spring 4 has protrusions 9, which are spaced apart from each other, with a recess 8 that is substantially rectangular in plan view therebetween. A connecting portion 10 is formed in the recess 8.

The connecting portion 10 is supported by the protrusions 9 through the intermediation of support portions 11 and is swingable around an axis in the direction of the arrow B.

Further, a hole 12 which is substantially rectangular in plan view is formed in the connecting portion 10, and a joint portion 13 is formed in the hole 12.

The joint portion 13 is supported by support portions 14, and is swingable around an axis which is perpendicular to the direction of the arrow B.

The slider 3 is joined to the joint portion 13, and the center C of the slider 3 is matched with the swinging axis formed by the support portions 14.

The pivot 5 slightly biases the gimbal spring 4 toward the magnetic disc 2 to thereby hold the magnetic head 1 in slide contact with the magnetic disc 2.

The support point 5a of this pivot 5 is arranged at a position spaced apart from the center C on the downstream side K with respect to the rotating (running) direction.

The operation of the magnetic head 1, constructed as described above, will now be described.

The gimbal spring 4 is supported while being biased toward the magnetic disc 2 by the pivot 5.

Since the slider 3 is joined to the gimbal spring 4, the slider 3 is also biased toward the magnetic disc 2 by the biasing force of the pivot 5.

Since the magnetic disc 2 is rotating at high speed, an airflow generated as a result of the rotation enters the gap between the slider 3 and the magnetic disc 2 and causes the upstream side J of the slider 3 to be raised and the downstream side K thereof to be brought close to the magnetic disc 2.

Since the magnetic gap 6 is formed on the downstream side K of the slide contact surface, the slider 3 is maintained in the holding state with respect to the magnetic disc 2 even when the slider 3 is inclined as a result of the entering of the airflow.

When recording/reproducing information on/from the magnetic disc 2 by using the magnetic head 1 and the pivot 5, constructed as described above, a test was conducted varying the thickness H of the slider 3, the length L thereof in the direction of the arrow B, and the distance A between the end 15 on the upstream side J with respect to the direction of the arrow B and the magnetic gap 6, with the rotating speed of the magnetic disc being set at 2400±120 (r.p.m.) and the biasing force of the pivot 5 at 12±4 (gf).

FIG. 3 shows various values of L, A and H and values of $(A/L) \times (1/H)$ calculated from these values.

Figure 4:
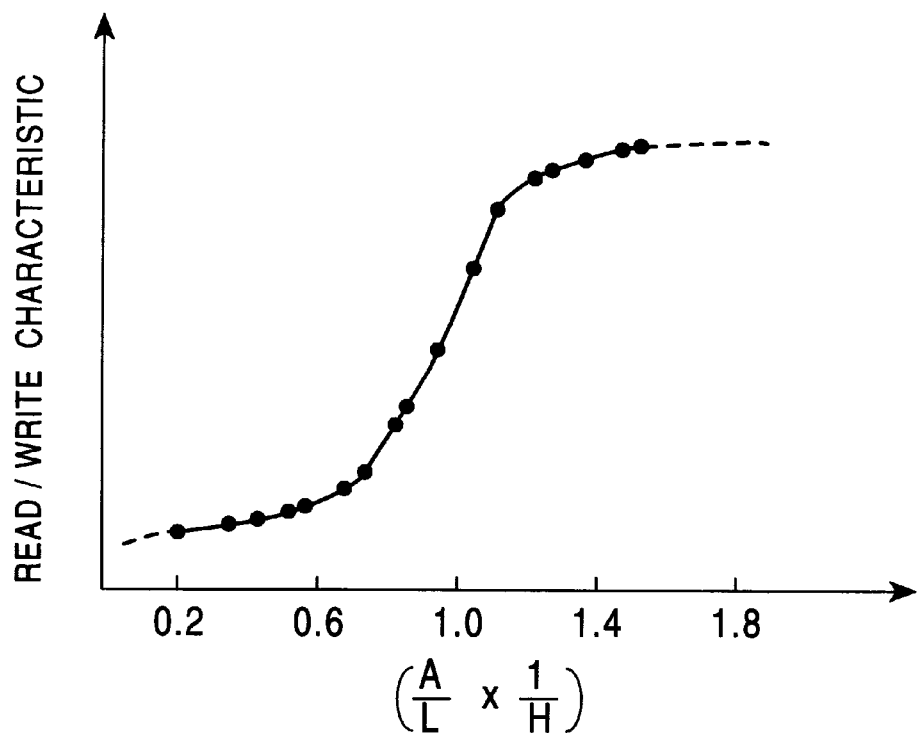
FIG. 4 is a diagram showing read/write characteristic obtained by using a magnetic head according to an embodiment of the present invention.

FIG. 4 shows read/write characteristics obtained in this test by the magnetic head 1, with the value of $(A/L) \times (1/H)$ being thus varied.

From the results shown in FIG. 4, it has been ascertained that a remarkable improvement in read/write characteristics occurs where the value of $(A/L) \times (1/H)$ gets beyond 0.6, and that a satisfactory read/write characteristic can be obtained when the value is not less than 1.0.

In addition, it has been ascertained that when the value of $(A/L) \times (1/H)$ is 1.2 or more, a stable saturated condition is achieved.

In the magnetic head of this embodiment, a satisfactory read/write characteristic can be obtained by setting the value of $(A/L) \times (1/H)$ at 1.0 or more.

Further, by setting the value of $(A/L) \times (1/H)$ at 1.2 or more, it is possible to obtain a highly stable read/write characteristic.

By maintaining the above set value, it is possible to reduce the biasing force of the pivot 5.

That is, it is possible to prevent the magnetic gap 6 and the magnetic disc 2 from being damaged by the biasing force of the pivot 5.

Next, the magnetic head support structure of the first embodiment of the present invention will be described with reference to FIGS. 5 and 6.

In these drawings, the components which are the same as those of the conventional example shown in FIG. 10 are indicated by the same reference numerals, and a description of such components will be omitted.

Figure 5:
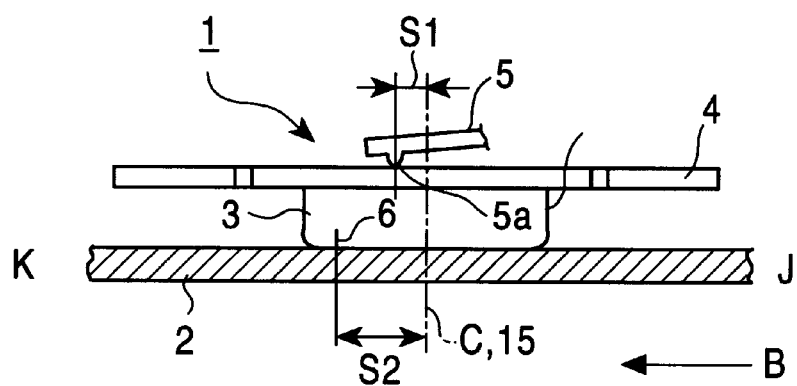
FIG. 5 is a front view showing a magnetic head support structure according to a first embodiment of the present invention which is in slide contact with a magnetic recording medium while being supported by a support member.

In FIG. 5, numeral 1 indicates a magnetic head, and numeral 2 indicates a magnetic disc.

The magnetic head 1 is held in slide contact with the magnetic disc 2 rotating in the direction of an arrow B to record/reproduce information, and is generally composed of a slider 3 and a gimbal spring 4 that is joined to the slider 3.

On the downstream side K of the slide contact surface of the slider 3 with respect to the rotating (running) direction, a magnetic gap 6 is formed at a position spaced apart from the center C in the direction of the arrow B by a distance S2 (second distance).

The surface of the slider 3 opposite to the slide contact surface is joined to the gimbal spring 4.

Figure 6:
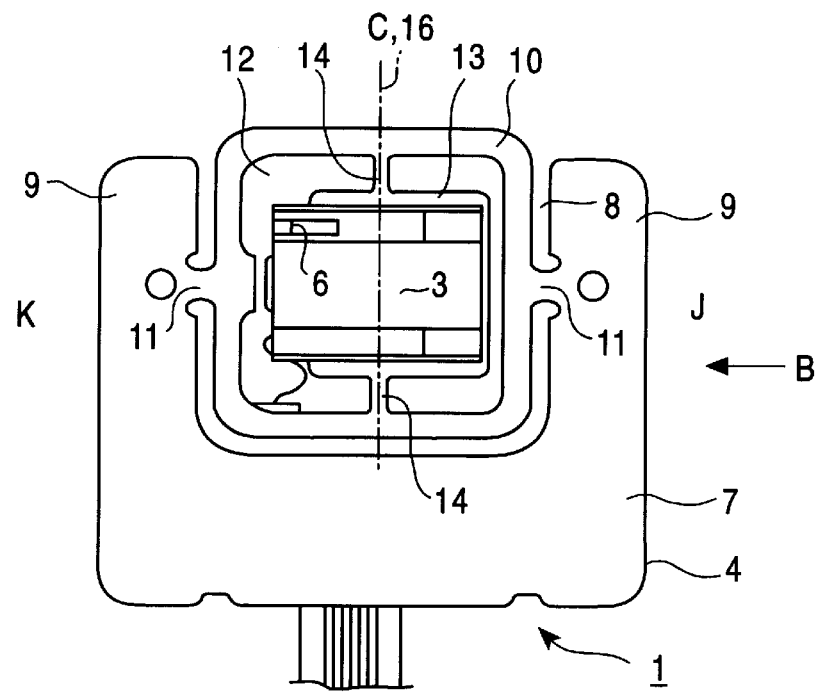
FIG. 6 is a plan view of the magnetic head support structure according to the first embodiment of the present invention, showing in plan view a gimbal spring joined to the magnetic head main body.

As shown in FIG. 6, the gimbal spring 4 is formed of an elastic material that is substantially rectangular in plan view.

The main body 7 of the gimbal spring 4 has protrusions 9, which are spaced apart from each other with a recess 8 having a substantially rectangular configuration in plan view being therebetween, and a connecting portion 10 is formed in the recess 8.

This connecting portion 10 is supported by the protrusions 9 through the intermediation of support portions 11, and is swingable around an axis in the direction of the arrow B.

Further, the connecting portion 10 has a hole 12 that is substantially rectangular in plan view, and a joint portion 13 is formed in the hole 12.

The joint portion 13 is supported by the connecting portion 10 through the intermediation of support portions 14, and is swingable around an axis 16 that is in a direction perpendicular to the direction of the arrow B.

Further, the slider 3 is joined to the joint portion 13, and the center C of the slider 3 is matched with the swinging axis 16 formed by the support portions 14.

The pivot 5 supports the gimbal spring 4 while slightly biasing it toward the magnetic disc 2 to thereby cause the magnetic head 1 to be in slide contact with the magnetic disc 2.

Further, the support point 5a of the pivot 5 is arranged at a position spaced apart from the center C on the downstream side K with respect to the rotating direction by a distance S1 (first distance). The position at this distance S1 is nearer to the upstream side J than the position at which the magnetic gap 6 is formed.

The operation of the magnetic head 1, constructed as described above, will now be described.

The gimbal spring 4 is supported while being biased toward the magnetic disc 2 by the pivot 5.

Since the slider 3 is joined to the gimbal spring 4, the slider 3 is also biased toward the magnetic disc 2 by the biasing force of the pivot 5.

Since the magnetic disc 2 is rotating at high speed, an airflow that is generated as a result of the rotation enters the gap between the slider 3 and the magnetic disc 2, whereby the upstream side J of the slider 3 is raised and the downstream side K thereof is brought close to the magnetic disc 2.

In addition to the fact that the magnetic gap 6 is formed on the downstream side K of the slide contact surface, the support point 5a of the pivot 5 is arranged at a position spaced apart from the center C on the downstream side K, so that the slider is maintained in the holding state with respect to the magnetic disc 2 even when the slider 3 is inclined as a result of the entering of the airflow.

Further, the support point 5a of the pivot 5 is arranged not directly above the magnetic gap 6 but on the upstream side J, so that the magnetic gap 6 is biased toward the magnetic disc 2 with some play being left therebetween.

When recording/reproducing information on/from the magnetic disc 2 by using the magnetic head 1 and the pivot 5, constructed as described above, a test was conducted varying the ratio of the distance S1 between the center C of the slider 3 and the support point 5a of the pivot 5 to the distance S2 between the center C of the slider 3 and the magnetic gap 6, with the rotating speed of the magnetic disc 2 being set at 2400±120 (r.p.m.) and the biasing force of the pivot 5 at 12±4 (gf).

Figure 8:
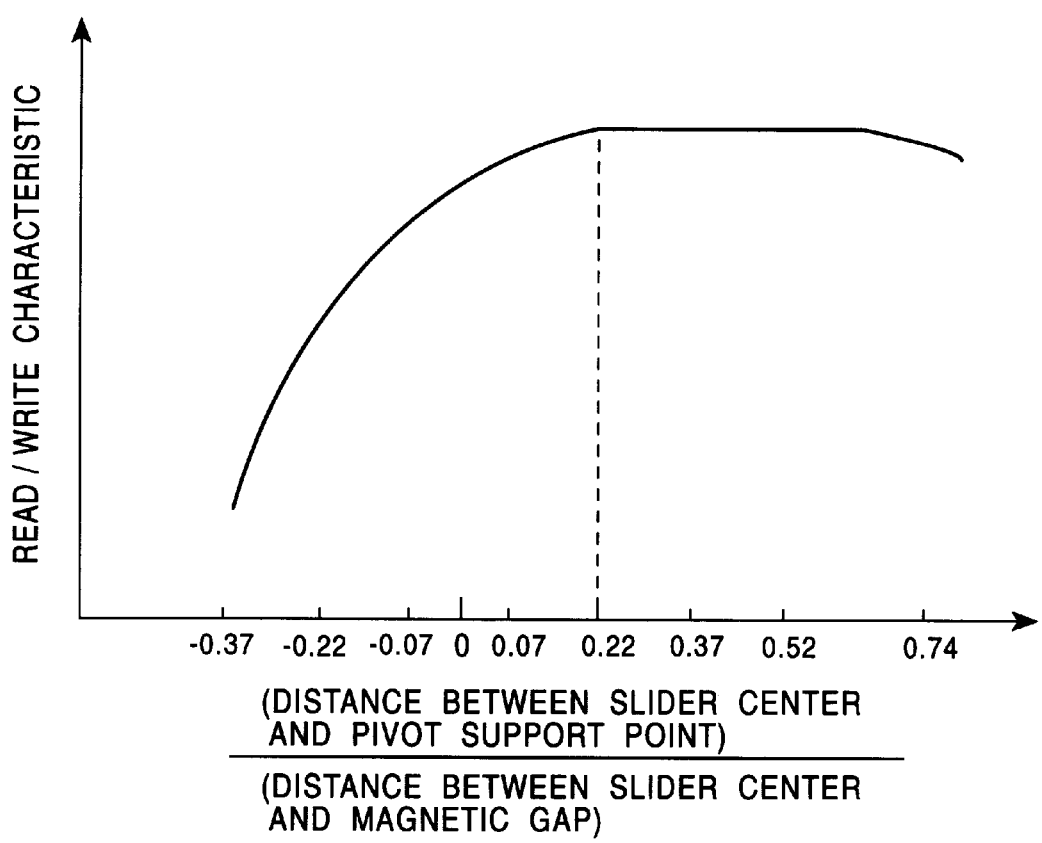
FIG. 8 is a diagram showing a read/write characteristic obtained by a magnetic head support structure according to an embodiment of the present invention.

In this test, the value of the distance S2 was fixed to 1.346 mm, and the value of the distance S1 was varied. FIG. 8 shows the read/write characteristics thus obtained by the magnetic head 1.

In the diagram, the negative values shown in the horizontal axis indicate that the support point 5a is positioned on the upstream side J of the center C. The other values indicate that the support point is on the downstream side K of the center C.

From the results shown in FIG. 8, it has been ascertained that the read/write characteristic is substantially in the saturated state when the value of the ratio of the distance S1 to the distance S2, that is, (the distance between the slider center C and the support point 5a of the pivot 5)/(the distance between the slider center C and the magnetic gap 6), is 0.22.

That is, it has been ascertained that a satisfactory read/write characteristic can be obtained when the value of S1/S2 is 0.22 or more.

In the magnetic head support structure of this embodiment, it is possible to obtain a satisfactory read/write characteristic by setting the value of S1/S2 at 0.22 or more.

That is, it is possible to reduce the biasing force of the pivot 5 with respect to the magnetic disc 2.

Further, since the support point 5a of the pivot 5 is arranged not directly above the magnetic gap 6 but on the upstream side J, the magnetic gap 6 has some play with respect to the magnetic disc 2, so that it is possible to prevent the magnetic gap 6 and the magnetic disc 2 from being damaged by the biasing force of the pivot 5.

Further, if the support portions 14 of the gimbal spring 4 are on the upstream side J of the center C of the slider 3, the area of the slider 3 on the upstream side J of the support portions 14 is relatively small, so that the lift due to the airflow is reduced. In the present invention, the center C of the slider 3 is matched with the swinging axis formed by the support portions 14, so that a sufficient lift is obtained on the upstream side J. Thus, it is possible to enhance the slide contact with respect to the magnetic disc 2 on the downstream side K.

Figure 7:
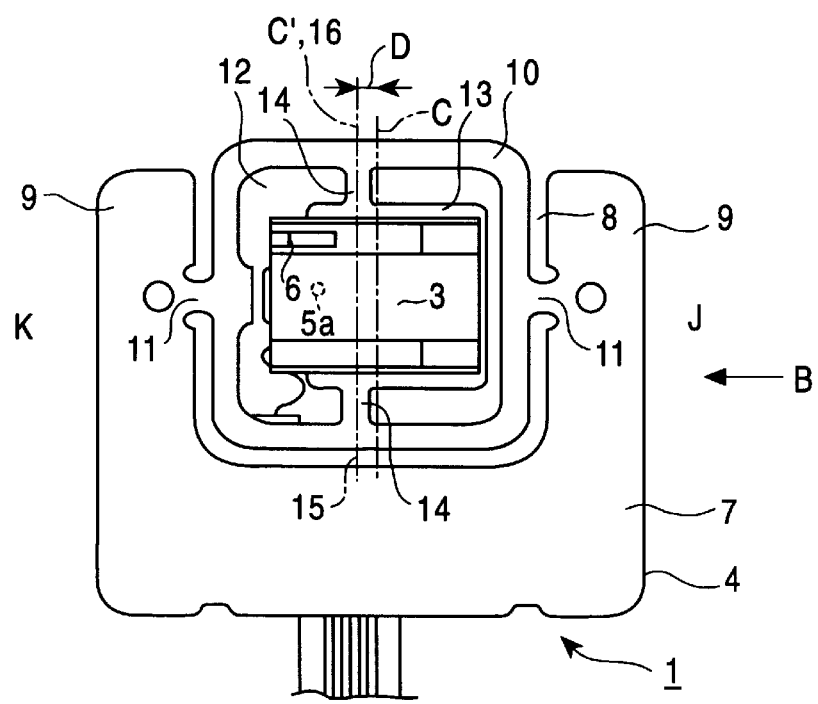
FIG. 7 is a plan view of a magnetic head support structure according to a second embodiment of the present invention, showing in plan view a gimbal spring joined to the magnetic head main body.

FIG. 7 is a diagram showing a magnetic head support structure according to a second embodiment of the present invention.

In the drawing, the components which are the same as those of the first embodiment shown in FIGS. 5 and 6 are indicated by the same reference numerals, and a description of such components will be omitted.

The second embodiment differs from the first embodiment in the position of the support portions 14 in the gimbal spring 4.

As shown in FIG. 7, the support portions 14 of the gimbal spring 4 are formed at a position C', which is on the downstream side K of the center C of the slider 3 and spaced apart therefrom by a distance D.

Apart from the above, the second embodiment has the same construction as the first embodiment.

When recording/reproducing information on/from the magnetic disc 2 by using the magnetic head 1 and the pivot 5, constructed as described above, a test was conducted varying the distance D between the center C of the slider 3 and the swinging axis 15 of the gimbal spring 4, with the rotating speed of the magnetic disc 2 being set at 2400±120 (r.p.m.), the biasing force of the pivot 5 at 12±4 (gf), and the ratio of the distance S1 to the distance S2 at 0.37.

Figure 9:
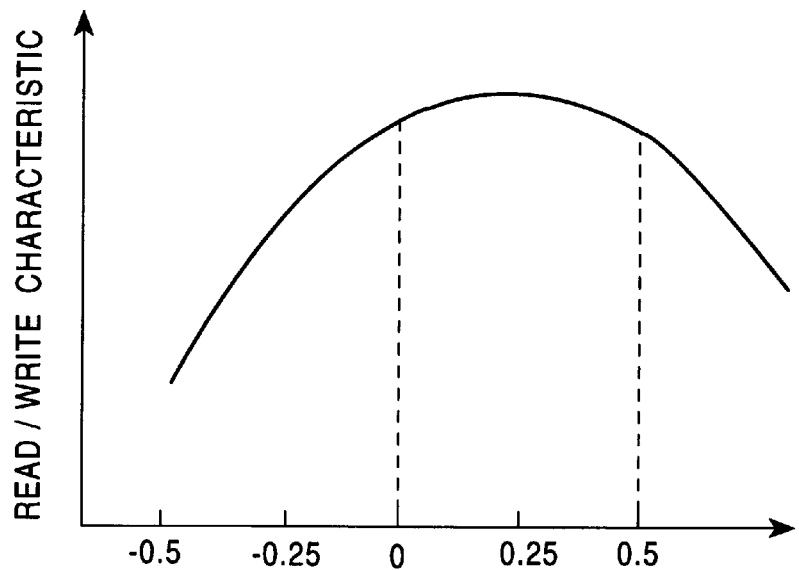
FIG. 9 is a diagram showing a read/write characteristic obtained by a magnetic head support structure according to an embodiment of the present invention.

FIG. 9 shows the read/write characteristics obtained in this test by the magnetic head 1.

In the diagram, the negative values in the horizontal axis indicate that the swinging axis 16 is on the upstream side J of the center C, and the other values indicate that it is on the downstream side K of the center C.

From the results shown in FIG. 9, it has been ascertained that the read/write characteristic is at its peak when the distance D between the center C of the slider 3 and the swinging axis 16 of the gimbal spring 4 is in the range from 0 mm to 0.5 mm.

That is, it has been ascertained that, when the swinging axis 16 is on the downstream side K, and the distance D between the center C of the slider 3 and the swinging axis 16 is 0.5 mm or less, it is possible to obtain a satisfactory read/write characteristic.

In the magnetic head support structure of this embodiment, it is possible to obtain the same effect as that of the first embodiment described above. Further, the area of the slider 3 is enlarged on the upstream side J of the support portions 14, and the lift due to the entering airflow is increased accordingly.

Thus, as the upstream side J of the slider 3 is further raised, the slide contact thereof with the magnetic disc 2 on the downstream side K, where the magnetic gap 6 is formed, is further enhanced.

That is, it is possible to obtain a more satisfactory read/write characteristic.

As described above, in the magnetic head in accordance with claim 1, the magnetic gap is positioned on the downstream side of the center of the magnetic head main body, and the following relationship is satisfied: $(A/L) \times (1/H) > 1.0$, where L is the length of the entire magnetic head main body, H is the thickness thereof, and A is the distance between the upstream side end and the magnetic gap.

Due to this arrangement, the holding state of the magnetic head main body with respect to the magnetic recording medium is not cancelled even when the magnetic recording medium is rotated at high speed, and it is possible to obtain a magnetic head having a satisfactory read/write characteristic.

In the magnetic head according to claim 2, the value of (A/L)×(1/H) is 1.2 or more.

Due to this arrangement, it is possible to obtain a highly stable read/write characteristic. Further, the magnetic gap and the magnetic recording medium are not damaged, so that it is possible to obtain a magnetic head having a long service life.

Further, in the magnetic head support structure according to claim 3, the magnetic gap is formed on the downstream side of the center of the magnetic head main body, and the support point of the support member for supporting the magnetic head toward the magnetic recording medium is arranged at a position spaced apart from the center of the magnetic head main body.

Due to this arrangement, the holding state of the magnetic head main body is not cancelled even when the magnetic recording medium is rotated at high speed, so that it is advantageously possible to obtain a highly reliable magnetic head.

In the magnetic head support structure according to claim 4, the support point of the support member is positioned on the upstream side of the magnetic gap, and the ratio of the distance between the center of the magnetic head main body and the position of the support point to the distance between the center of the magnetic head main body and the magnetic gap is 0.22 or more.

Due to this arrangement, a satisfactory read/write characteristic is obtained. In addition, the magnetic gap and the magnetic recording medium are not damaged, so that it is possible to obtain a magnetic head having a long service life.

In the magnetic head support structure according to claim 5, the center of the magnetic head main body is matched with the swinging axis formed by the support portions of the gimbal spring.

Due to this arrangement, the slide contact of the magnetic head main body with respect to the magnetic recording medium is enhanced, whereby it is possible to obtain a highly stable magnetic head.

In the magnetic head support structure according to claim 6, the support portions of the gimbal spring are formed at a position on the downstream side spaced apart from the center of the magnetic head main body and on the upstream side of the support point of the support member.

Due to this arrangement, the slide contact of the magnetic gap with respect to the magnetic recording medium is further enhanced, whereby it is advantageously possible to obtain a more satisfactory read/write characteristic.

In the magnetic head support structure according to claim 7, the distance between the swinging axis and the center of the magnetic head main body is 0.5 mm or less.

Due to this arrangement, it is advantageously possible to obtain a more satisfactory read/write characteristic.

What is claimed is:

1. A magnetic head support structure comprising:

a magnetic head main body having a magnetic gap formed in a slide contact surface which records and reproduces information while being held in slide contact with a magnetic recording medium running in a direction, a gimbal spring to which the magnetic head main body is joined and which swingably supports the magnetic head main body, and a support member which biases the gimbal spring at a support point toward the magnetic recording medium, wherein on the slide contact surface of the magnetic head main body, the magnetic gap is situated on a downstream side of a center line of the magnetic head main body with respect to said direction and is situated in a direction transverse to said direction, wherein the center line is transverse to said direction, and wherein said support point is entirely situated on the downstream side of the center line of the magnetic head main body with respect to said direction, and wherein the relationship holds true: $(A/L) \times (1/H) \geq 1.0$, where L is the length in said direction of the magnetic head main body, A is the distance between the upstream end in said direction of the magnetic head main body and the magnetic gap, and H is the thickness of the magnetic head main body.

2. A magnetic head support structure according to claim 1, wherein the value of said $(A/L) \times (1/H)$ is 1.2 or more.

3. A magnetic head support structure according to claim 1, wherein the support point of said support member is positioned on the upstream side of said magnetic gap, and wherein, assuming that the distance between the center of said magnetic head main body with respect to said direction and the position of said support point is a first distance and that the distance between the center of said magnetic head main body with respect to said direction and said magnetic gap is a second distance, the ratio of the first distance to the second distance is 0.22 or more.

4. A magnetic head support structure according to claim 3, wherein the center of said magnetic head main body with respect to said direction is matched with a swinging axis formed by the support portion of said gimbals spring.

5. A magnetic head support structure according to claim 3, wherein the swinging axis formed by the support portion of said gimbals spring is formed on the downstream side at a position space apart from the center of said magnetic head main body with respect to said direction and on the upstream side of the support point of said support member.

6. A magnetic head support structure according to claim 5, wherein the distance between the swinging axis and the center of said magnetic head main body with respect to said direction is not larger than 0.5 mm.

* * * * *